United States Patent
Even et al.

(10) Patent No.: US 7,723,396 B2
(45) Date of Patent: May 25, 2010

(54) FOAM COMPOSITES WITH EMULSION POLYMER FILMS

(75) Inventors: Ralph Craig Even, Blue Bell, PA (US);
Robert Victor Slone, Pudong (CN);
Sekhar Sundaram, Haverford, PA (US)

(73) Assignee: Rohm and Haas Company, Philadelphia, PA (US)

( * ) Notice: Subject to any disclaimer, the term of this patent is extended or adjusted under 35 U.S.C. 154(b) by 94 days.

(21) Appl. No.: 12/006,841

(22) Filed: Jan. 7, 2008

(65) Prior Publication Data

US 2008/0281005 A1 Nov. 13, 2008

Related U.S. Application Data

(63) Continuation-in-part of application No. 12/004,242, filed on Dec. 20, 2007.

(60) Provisional application No. 60/928,936, filed on May 11, 2007, provisional application No. 60/876,845, filed on Dec. 22, 2006.

(51) Int. Cl.
*B01F 3/00* (2006.01)
*B32B 25/00* (2006.01)
*B32B 27/00* (2006.01)
*B32B 27/32* (2006.01)
*B32B 5/18* (2006.01)

(52) U.S. Cl. ............ 521/66; 52/309.4; 52/309.9; 428/319.3; 428/313.5

(58) Field of Classification Search ............ 428/319.3, 428/313.5; 52/309.4, 309.9; 521/66
See application file for complete search history.

(56) References Cited

U.S. PATENT DOCUMENTS

| | | | |
|---|---|---|---|
| 3,450,649 A * | 6/1969 | Youker ........................ | 521/67 |
| 3,565,742 A * | 2/1971 | Stephens et al. ............ | 428/356 |
| 4,814,373 A * | 3/1989 | Frankel et al. ............. | 524/460 |
| 5,093,405 A | 3/1992 | Frankel et al. | |
| 5,227,433 A | 7/1993 | Frankel et al. | |
| 5,252,657 A | 10/1993 | Frankel et al. | |
| 5,290,857 A | 3/1994 | Ashida et al. | |
| 5,695,837 A | 12/1997 | Everaerts et al. | |
| 6,060,532 A | 5/2000 | Frankel et al. | |
| 6,262,114 B1 * | 7/2001 | Nakai et al. ................. | 514/533 |
| 6,262,144 B1 * | 7/2001 | Zhao et al. .................. | 523/201 |
| 2002/0082319 A1 | 6/2002 | Zhao et al. | |
| 2006/0182958 A1 | 8/2006 | Okochi et al. | |
| 2007/0187033 A1 | 8/2007 | Schumacher et al. | |
| 2008/0044611 A1 | 2/2008 | Husemann et al. | |

FOREIGN PATENT DOCUMENTS

EP 342562 A2 * 11/1989

* cited by examiner

*Primary Examiner*—Kelechi C Egwim
(74) *Attorney, Agent, or Firm*—Stephen T. Falk

(57) ABSTRACT

This invention relates to composites comprising a substrate and a multi-stage latex polymer emulsion film.

10 Claims, No Drawings

FOAM COMPOSITES WITH EMULSION POLYMER FILMS

CROSS REFERENCE TO RELATED PATENT APPLICATIONS

This invention claims priority to U.S. Provisional Application No. 60/928,936 filed May 11, 2007, as a continuation-in-part of U.S. application Ser. No. 12/004,242 filed on Dec. 20, 2007, which claims priority to U.S. Provisional Application No. 60/876,845 filed on Dec. 22, 2006.

The present invention relates to composites formed from substrates and an aqueous dispersion of an improved water-insoluble latex polymer. The present invention further relates to composites of foamed polymer substrates and emulsion polymers. The present invention further relates to composites of plasticized polymer substrates and emulsion polymers.

Maintaining performance of pressure sensitive adhesives (PSAs) on challenging substrates, such as foamed or plasticized substrates, upon aging is required for many adhesive applications. For example, insulating foams and vibration dampening foams can be subjected to high temperature or humidity resulting in loss of adhesive performance over time. Historically, solvent-based adhesives have been preferred for such demanding applications. Environmental considerations, however, favor elimination of solvents. This and higher coating speeds attainable with emulsion PSAs, favor their use in place of solvent-based PSAs.

Typically, PSAs exhibit a degradation of either or both of peel or shear strength over time. Shear strength relates to how the adhesive responds to lateral stress caused by something pulling it sideways. This characteristic directly impacts how much weight the adhesive can carry. The peel strength relates to how strong a bond the adhesive has formed with a given surface, or in other words, how resistant the adhesive is to being peeled off of a given surface.

U.S. Pat. No. 6,262,144 discloses aqueous dispersions of water-insoluble latex polymer formed by a two stage process and compositions which may be useful as PSAs. Although U.S. Pat. No. 6,262,144 attempts to solve problems associated with cohesion/adhesion balance, it does not address the formation of the inventive composites or issues of performance on ageing.

The present invention provides a composite formed from a polymer foam substrate or a plasticized polymeric substrate and a latex polymer emulsion, where the emulsion is formed by a multi-stage polymerization process. The composite of the present invention exhibits excellent retention of PSA properties on ageing.

As used herein, the use of the term "(meth)" followed by another term such as acrylate refers to both acrylates and methacrylates. For example, the term "(meth)acrylate" refers to either acrylate or methacrylate; the term "(meth)acrylic" refers to either acrylic or methacrylic; the term "(meth)acrylonitrile" refers to either acrylonitrile or methacrylonitrile; and the term "(meth)acrylamide" refers to either acrylamide or methacrylamide.

"Glass transition temperature" or "$T_g$" as used herein, means the temperature at or above which a glassy polymer will undergo segmental motion of the polymer chain. Glass transition temperatures of a polymer can be estimated by the Fox equation [*Bulletin of the American Physical Society*, 1, 3, p. 123 (1956)] as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, and $T_{g(1)}$ and $T_{g(2)}$ refer to the glass transition temperatures of the two corresponding homopolymers in degrees Kelvin. For polymers containing three or more monomers, additional terms are added ($w_n/T_{g(n)}$). The $T_g$ of a polymer phase can also be calculated by using the appropriate values for the glass transition temperatures of homopolymers, which may be found, for example, in *Polymer Handbook*, edited by J. Brandrup and E. H. Immergut, Interscience Publishers [date]. The values of $T_g$ reported herein are calculated using the Fox equation. When calculating the overall $T_g$ of aqueous polymer dispersions having multiple weight average particle diameter distributions, a calculated $T_g$ of each portion of the dispersion applies. More particularly, an overall Tg of a polymers dispersion would be calculated, using the Fox Equation, based upon all of the monomers in the dispersion.

As used herein "low water solubility" is defined as less than about 6% solubility in deionized $H_2O$ at 25° C.

In one embodiment of the present invention, there is provided a composite article comprising a polymer foam and a film formed from a latex polymer emulsion, wherein the latex polymer emulsion is prepared by a process comprising: (a) preparing by emulsion polymerization a first stage polymer of at least one ethylenically unsaturated monomer, wherein said first stage polymer has a Tg of less than −20° C.; (b) dispersing in the first stage polymer, additional ethylenically unsaturated monomer comprising at least one monomer having at least two sites of alpha, beta-ethylenic unsaturation, whereby the additional monomer swells the first stage polymer, and (c) polymerizing the additional monomer within the monomer-swollen first stage polymer. The foam may comprise polyvinyl chloride resin and at least one plasticizer.

In another embodiment of the present invention, there is provided a composite article comprising polyvinyl chloride substrate comprising at least one plasticizer, and a film formed from a latex polymer emulsion, wherein the latex polymer emulsion is prepared by a process comprising: (a) preparing by emulsion polymerization a first stage polymer of at least one ethylenically unsaturated monomer, wherein said first stage polymer has a Tg of less than −20° C.; (b) dispersing in the first stage polymer, additional ethylenically unsaturated monomer comprising at least one monomer having at least two sites of alpha, beta-ethylenic unsaturation, whereby the additional monomer swells the first stage polymer, and (c) polymerizing the additional monomer within the monomer-swollen first stage polymer.

Plasticizers present in the substrate may be polymeric or monomeric plasticizers. The latex polymer emulsion may comprise tackifier.

The preparation of aqueous dispersions of water-insoluble latex polymers by emulsion polymerization is well known in the art. The practice of emulsion polymerization is discussed in detail in D. C. Blackley, *Emulsion Polymerization* (Wiley, 1975). Conventional emulsion polymerization techniques may be used to prepare the first stage of water-insoluble latex polymer of this invention. The practice of emulsion polymerization is also discussed in H. Warson, *The Applications of Synthetic Resin Emulsions*, Chapter 2 (Ernest Benn Ltd., London 1972).

Thus, monomers may be emulsified with an anionic, cationic or nonionic dispersing agent, using for example from about 0.25% to 5% by weight of dispersing agent on the weight of total monomers. Combinations of anionic and non-ionic emulsifiers may also be used. High molecular weight polymers such as hydroxy ethyl cellulose, methyl cellulose and polyvinyl alcohol may be used as emulsion stabilizers and protective colloids, as may polyelectrolytes such as polyacrylic acid. Acidic monomers, particularly those of low molecular weight, such as acrylic and methacrylic acid, are water-soluble, and thus may serve as dispersing agents which aid in emulsifying the other monomers used.

Suitable cationic dispersion agents include lauryl-pyridinium chlorides, cetyldimethyl amine acetate, and alkyldimethylbenzylammonium chlorides in which the alkyl group has from 8 to 18 carbon atoms.

Suitable anionic dispersing agents include, for example, the higher fatty alcohol sulfates, such as sodium lauryl sulfate, and the like; alkylaryl sulfonates such as sodium or potassium isopropylbenzene sulfonates or isopropyl naphthalene sulfonates, and the like; alkali metal higher alkyl sulfosuccinates, such as sodium octyl sulfosuccinate, sodium N-methyl, N-palmitoyltaurate, sodium oleyl isothionate, and the like; and alkali metal salts of alkylarylpolyethoxyethanol sulfates or sulfonates, such as sodium tert-octylphenoxypolyethoxyethyl sulfate having 1 to 5 oxyethylene units, and the like.

Suitable non-ionic dispersing agents include alkylphenoxypolyethoxyethanols having alkyl groups of from about 7 to 18 carbon atoms and from about 6 to about 60 oxyethylene units, such as heptylphenoxypolyethoxy-thanols, methyloctylphenoxypolyethoxyethanols, and the like; polyethoxy-thanol derivatives of methylene-linked alkyl phenols; sulfur-containing agents such as those made by condensing from about 6 to about 60 moles of ethylene oxide with nonyl mercaptan, dodecyl mercaptan, and the like, or with alkylthiophenols wherein the alkyl groups contain from 6 to 16 carbon atoms; ethylene oxide derivatives of long-chained carboxylic acids, such as lauric acid, myristic acid, palmitic acid, oleic acid, and the like, or mixtures of acids such as those found in tall oil containing from 6 to 60 oxyethylene units per molecule; analagous ethylene oxide condensates of long-chained alcohols such as octyl, decyl, lauryl, or cetyl alcohols, ethylene oxide derivative of etherified or esterified polyhydroxy compounds having a hydrophobic hydrocarbon chain, such as sorbitan monostearate containing from 6 to 60 oxyethylene units; also, ethylene oxide condensates of long-chain or branched chain amines, such as dodecyl amine, hexadecyl amine, and octadecyl amine, containing from 6 to 60 oxyethylene units; block copolymers of ethylene oxide sections combined with one or more hydrophobic propylene oxide sections. Mixtures of alkyl benzenesulfonates and ethoxylated alkylphenols may be employed.

A polymerization initiator of the free radical type, such as ammonium or potassium persulfate, may be used alone or as the oxidizing component of a redox system, which also includes a reducing component such as potassium metabisulfite, sodium thiosulfate or sodium formaldehyde sulfoxylate. The reducing component is frequently referred to as an accelerator. The initiator and accelerator, commonly referred to as catalyst, catalyst system or redox system, may be used in proportion from about 0.01% or less to 3% each, based on the weight of monomers to be copolymerized. Examples of redox catalyst systems include t-butyl hydroperoxide/sodium formaldehyde sulfoxylate/Fe(II), and ammonium persulfate/sodium bisulfite/sodium hydrosulfite/Fe(II). The polymerization temperature may be from room temperature to 90° C., or higher, and may be optimized for the catalyst system employed, as is conventional. Emulsion polymerization may be seeded or unseeded. Seeded polymerization tends to yield aqueous dispersions of latex polymer having more uniform physical properties than unseeded polymerization.

Chain transfer agents including mercaptans, polymercaptans and polyhalogen compounds are sometimes desirable in the polymerization mixture to moderate polymer molecular weight. Examples of chain transfer agents which may be used include long chain alkyl mercaptans such as t-dodecyl mercaptans, alcohols such as isopropanol, isobutanol, lauryl alcohol or t-octyl alcohol, carbon tetrachloride, tetrachloroethylene and trichloro-bromoethane. Generally from 0.05 to 0.5% by weight or from 0.05 to 0.25%, based on the weight of the monomer mixture used to form the first stage polymer, may be used.

The polymerization process may be a thermal or redox type; that is, free radicals may be generated solely by the thermal dissociation of an initiator species or a redox system may be used. A monomer emulsion containing all or some portion of the monomers to be polymerized may be prepared using the monomers, water and emulsifiers. A catalyst solution containing catalyst in water may be separately prepared. The monomer emulsion and catalyst solution may be co-fed into the polymerization vessel over the course of the emulsion polymerization. The reaction vessel itself may initially contain water. The reaction vessel may also additionally contain seed emulsion and further may additionally contain an initial charge of polymerization catalyst. The temperature of the reaction vessel during the emulsion polymerization may be controlled by cooling to remove heat generated by the polymerization reaction or by heating the reaction vessel. Several monomer emulsions may be simultaneously co-fed into the reaction vessel. When multiple monomer emulsions are co-fed, they may be of different monomer composition. The sequence and rates at which the diverse monomer emulsions are co-fed may be altered during the emulsion polymerization process. After addition of the monomer emulsion or emulsions has been completed, the polymerization reaction mixture may be chased to minimize the concentrations of unreacted monomer and unreacted polymerization catalyst species. The pH of the contents of the reaction vessel may also be altered during the course of the emulsion polymerization process. Both thermal and redox polymerization processes may be employed.

The monomers used in preparing the first stage polymer may be any of those conventionally used in the synthetic resin emulsion art. Acrylic monomers are preferred for preparing latex polymer to be used in adhesive coating compositions. Examples of acrylic monomers include the ($C_1$-$C_{24}$) alkyl esters of acrylic and methacrylic acids. Examples of ($C_1$-$C_{24}$) alkyl groups of esters of acrylic and methacrylic acids which may be used in forming the first stage polymer used in the invention include: methyl, propyl, isopropyl, butyl, isobutyl, sec-butyl, t-butyl, amyl, isoamyl, t-amyl, hexyl, cyclohexyl, 2-ethylhexyl, octyl, decyl, lauryl, myristyl, cetyl, stearyl groups and the like. Specific examples include: methyl methacrylate, ethyl acrylate, or n-butyl acrylate, 2-ethylhexyl acrylate, lauryl methacrylate, isodecyl methacrylate, methyl acrylate, ethyl methacrylate, sec-butyl acrylate and t-butyl methacrylate. The ($C_1$-$C_{12}$) alkyl esters of acrylic and methacrylic acid are preferred in preparing the instant latex polymer. The monomer composition is selected to yield a first stage polymer having a glass transition temperature (Tg) characteristic of a random copolymer of less than −20° C.; preferably, −30° C., −40° C.

In one embodiment, the first stage polymer of the present invention comprises at least 40% by weight of total composition of at least one monomer having a homopolymer Tg of less than −40° C., and 10 to 50% of at least one soft, hydrophilic, nonionic, monomer. As used herein, "soft" monomer refers to a monomer having a Tg of less than 30° C., preferably less than 10° C. Soft hydrophilic monomer has homopolymer Tg less than about 30° C. and water solubility of about 2% or greater at 25° C. (preferred ethyl acrylate, methyl acrylate, vinyl acetate).

Other monoethylenically unsaturated polymerizable monomers useful in minor proportion (i.e., less than 5% by weight of the total monomer composition) as comonomers with acrylic monomers in preparing the first stage polymer of this invention include the vinylidene halides, vinyl halides, acrylonitrile, methacrylonitrile, vinyl esters such as vinyl formate, vinyl acetate and vinyl proprionate, and mixtures of ethylene and such vinyl esters, acrylic and methacrylic acid esters of alcohol ethers such as diethylene glycol monoethyl or monobutyl ether methacrylate, ($C_1$-$C_{10}$) alkyl esters of beta-acryloxypropionic acid and higher oligomers of acrylic acid, styrene and alkyl substituted styrenes and vinyl aromatics including alpha-methyl styrene, mixtures of ethylene and other alkylolefins such as propylene, butylene, pentene and the like, vinyl ethers such as methyl vinyl ether, ethyl vinyl ether, vinyl 2-methoxyethyl ether, vinyl 2-chloroethyl ether and the like. Butyl acrylate, 2-ethyl-hexyl acrylate, iso-octyl acrylate are especially preferred monomers for the first stage polymer. In some preferred embodiments the first stage polymer comprises from 0.25 to 5% of at least one nonionic monoethylenically unsaturated monomer having a homopolymer Tg of greater than 50° C., such as methyl methacrylate or styrene or other styrenic monomers.

Additional monoethylenically unsaturated polymerizable comonomers useful in preparing the first stage polymer of the invention include hydroxy functional vinyl monomers such as 2-hydroxyethyl methacrylate, 2-hydroxyethyl acrylate, 3-hydroxypropyl methacrylate, butanediol acrylate, 3-chloro-2-hydroxypropyl acrylate, 2-hydroxypropyl acrylate, and 2-hydroxypropyl methacrylate. Further examples of useful monomers include the partial esters of unsaturated aliphatic dicarboxylic acids and particularly the alkyl half esters of such acids. Examples of such partial esters are the alkyl half esters of itaconic acid, fumaric acid and maleic acid wherein the alkyl group contains 1 to 6 carbon atoms. Representative members of this group of compounds include methyl acid itaconic, butyl acid itaconic, ethyl acid fumarate, butyl acid fumarate, and methyl acid maleate. Minor amounts of other comonomers, such as adhesion promoting comonomers, may also be used. These monomers may be copolymerized with acrylic monomers to yield the first stage polymer.

Examples of alpha, beta-ethylenically unsaturated carboxylic acids which may be copolymerized with acrylic and other monomers in forming the first stage polymer of the invention include acrylic acid, methacrylic acid, beta-acryloxypropionic acid and higher oligomers of acrylic acid and mixtures thereof, ethacrylic acid, itaconic acid, aconitic acid, crotonic acid, citraconic acid, maleic acid, fumaric acid, alpha-chloroacrylic acid, cinnamic acid, mesaconic acid and mixtures thereof. Acrylic and methacrylic acids are preferred, and methacrylic acid is especially preferred. It is preferred that alpha, beta-ethylenically unsaturated carboxylic acid comprise an amount ranging from upper limits of 10, 5 or 3.5% to lower limits of 0.1, 0.25, or 0.5% by weight based on the total weight of monomer, of the first stage polymer monomer composition.

In addition to monoethylenically unsaturated monomer, small proportions of alpha, beta-ethylenically unsaturated monomer having at least two sites of alpha, beta-ethylenic unsaturation, that is, di- or multi-ethylenically unsaturated monomer, may be used as comonomer in preparing the first stage polymer. However, it is not necessary to employ any multi-ethylenically unsaturated monomer.

The initial latex polymer may be prepared immediately prior to the addition of the additional alpha, beta-ethylenically unsaturated monomer. Alternatively, the first stage polymer may itself be a commercially available emulsion prepared at some time substantially removed from the addition of the additional monomer.

In some preferred embodiments, the first stage polymer may be formed in the presence of a polymerizable surfactant. Suitable ethylenically unsaturated surfactant monomers include, but are not limited to for example, salts or quaternary nitrogen compounds comprising at least one acid, wherein the acid is a sulfonic acid, a carboxylic acid, or a phosphoric acid, or a mixture thereof, and at least one nitrogenous base, wherein the nitrogenous base contains at least one nitrogen atom and at least on ethylenically unsaturated moiety. Other suitable examples are described in U.S. Pat. Publ. No. 2003/0149119.

Other suitable polymerizable surfactant monomers include nonylphenoxy propenyl polyethoxylated sulphate (for example as Hitenol™ from Daiichi Corp); sodium alkyl allyl sulphosuccinate (for example as Trem™ LF-40 from Henkel Corp); ammonium di-(tricyclo(5.2.1.0 2, 6) dec-3-en-(8 or 9)oxyethyl sulfosuccinate; and ammonium di-(tricyclo (5.2.1.0 2,6) dec-3-en-(8 or 9) sulfosuccinate. Additionally, the ammonium and metal salts of unsaturated $C_6$ to $C_{30}$ organic acids can be used, alone or in combination with the above surfactants. Examples of these acids are: alpha methyl cinnamic acid, alpha phenyl cinnamic acid, oleic acid, lineolic acid (as described in U.S. Pat. No. 5,362,832), rincinoleic acid, the unsaturated fraction of Tall oil rosin and fatty acids, disproportionated rosin acid, soybean oil fatty acids, olive oil fatty acids, sunflower oil fatty acids, linseed oil fatty acids, safflower oil fatty acids, sorbitan mono-oleate, abietic acid, poly(oxyethylene) sorbitol sesquioleate, and Empol™ 1010 Dimer Acid. Additional suitable polymerizable surfactant monomers also include, for example, maleate derivatives (as described in U.S. Pat. No. 4,246,387), and allyl derivatives of alkyl phenol ethoxylates (as described in Japanese Patent 62-227435). The amount of surfactant used is typically from 0.1% to 6% by weight, based on the total weight of monomer.

Furthermore, 2 to 50, preferably 5 to 30, wt %, based on weight of first stage polymer of a low molecular weight polymeric component having a number average molecular weight of less than about 35,000 and a softening point of at least 40° C., as described in U.S. Pat. No. 4,912,169, may be blended in as a separate dispersion or formed in the presence of the first and/or second stage polymer as a separate polymerization step. Alternately, the first stage polymer may be formed in the presence of a low molecular weight polymeric component.

After preparation of the first stage polymer and prior to the second or subsequent stage(s), a polymerization inhibitor may be added or alternatively, the second or subsequent stage(s) in the process of preparing the compositions of this invention may be undertaken without the addition of the inhibitor. In the second step of this process, additional alpha, beta-ethylenically unsaturated monomer comprising at least one monomer having at least two sites of alpha, beta-ethylenically unsaturation, wherein said additional monomer has low water-solubility, is dispersed in the first stage aqueous dispersion of water insoluble-latex polymer. Examples of alpha, beta-ethylenically unsaturated monomer having at least two sites of alpha, beta-ethylenically unsaturation include ethyleneglycol dimethacrylate, diethyleneglycol dimethacrylate, triethyleneglycol dimethacrylate, polyethylene glycol dimethacrylate, polypropyleneglycol dimethacrylate, neopentylglycol dimethacrylate, 1,3-butyleneglycol diacrylate, neopentylglycol diacrylate, trimethylolethane trimethacrylate, dipentaerythritol triacrylate, dipentaerythritol tetracrylate, dipentaerythritol pentaacrylate, dimethallyl chlorendate, diallyl chlorendate, diallyl fumarate, diallyl itaconate, diallyl phthalate, diallylisophthalate, triallyl isocyanate, triallyl trimellitate, 1,6-hexenediol diacrylate, 1,3-butylene glycol dimethacrylate, trimethylolpropane trimethacrylate, trimethylol propane triacrylate, tripropylene glycol diacrylate, diallyl methacrylate, and divinyl benzene.

It is preferred that the additional alpha, beta-ethylenically unsaturated monomer, comprises amounts ranging from upper limits of 10, or 7.5% to lower limits of 0.25% or 0.5% by weight based on the total weight of the first stage polymer. All monomer ranges are inclusive and combinable. It is preferred that monomer having at least two sites of alpha, beta-ethylenic unsaturation be selected from the group consisting of monomers having two sites of alpha, beta-ethylenic unsaturation and monomers having three sites of alpha, beta-ethylenic unsaturation. It is also preferred that monomers having two sites of alpha, beta-ethylenic unsaturation be selected from the diacrylates and dimethacrylates. It is also preferred that monomers having three sites of alpha, beta-ethylenic unsaturation be selected from the triacrylates and trimethacrylates. In another embodiment it is preferred that the monomer having two sites of alpha, beta-ethylenic unsaturation be selected from divinyl benzene and aliphatic conjugated dienes. Of the preferred diacrylates and dimethacrylates, diethylene glycol dimethacrylate, ethylene glycol dimethacrylate, 1,6-hexene diol diacrylate, 1,3-butylene glycol dimethacrylate, and tripropylene glycol diacrylate are especially preferred. Of the preferred triacrylates and trimethacrylates, trimethylol propane triacrylate and trimethylol propane trimethacrylate are especially preferred.

Other monomers useful as monomer having at least two sites of alpha, beta-ethylenic unsaturation include the reaction products of at least one compound selected from the diisocyanates and triisocyanates and at least one compound selected from hydroxy ($C_1$-$C_6$) alkyl acrylates and the hydroxy($C_1$-$C_6$)alkyl methacrylates. Examples of these include the reaction product of 3-hydroxypropyl methacrylate and 2,4-toluene diisocyanate, and the reaction product of 2-hydroxyethyl acrylate and hexamethylene diisocyanate. Similarly, the reaction products of at least one compound selected from the di- and tri-epoxy functional compounds and at least one compound selected from acrylic acid and methacrylic acids may be employed. In addition, monomers selected from the reaction products of at least one compound selected from the di($C_1$-$C_4$) alkoxylated ($C_2$-$C_8$) alkanediols, tri($C_1$-$C_4$) alkoxylated ($C_4$-$C_{12}$) alkane triols, and di($C_1$-$C_4$) alkoxylated bisphenol A, and at least one compound selected from acrylic acid and methacrylic acid may be employed. The reaction product of trimethylol propane and beta-acryloxypropionic acid may also be employed.

Alpha, beta-ethylenically unsaturated monomer having at least two sites of alpha, beta-ethylenic unsaturation may be referred to as "multifunctional monomer" (MFM). In addition to the multifunctional monomer which may be added to the first stage polymer during the second step of the process of preparing the compositions of this invention, mono-ethylenically unsaturated monomer may also be employed in this second step with the multifunctional monomer. This may be accomplished by preparing a mixture of mono-ethylenically unsaturated monomer and multifunctional monomer and adding this mixture to the first stage polymer. Alternatively, multifunctional monomer and monoethylenically unsaturated monomer may be added. Examples of mono-ethylenically unsaturated monomer which may be employed include the ($C_1$-$C_{12}$) alkyl esters of acrylic acid, the ($C_1$-$C_{12}$) alkyl esters of methacrylic acid and isobornyl methacrylate.

The additional monomer which is used should be selected such that the additional monomer comprises a substantial proportion of monomer having low water solubility. Monomers with low water solubility will be preferentially distributed into the hydrophobic phase of the aqueous dispersion, that is, into the water-insoluble latex polymer, wherein it may be subsequently polymerized. Thus, it is desirable to employ monomer with low water solubility as additional monomer. Low levels, less than about 5 weight percent, of water soluble monomers such as ethylenically unsaturated carboxylic acids such as methacrylic acid or acrylic acid may be included in the additional monomer. Examples of multifunctional monomers which have low water solubility include trimethylolpropane trimethacrylate (water solubility at 25° C.: <0.01 g/100 g $H_2O$=0.01 wt. %), 1,3-butyleneglycol dimethacrylate (<0.01 wt. %), 1,4-butyleneglycol dimethacrylate (0.07 wt. %), 1,6-hexanediol diacrylate (0.05 wt. %), trimethylolpropane triacrylate (0.17 wt. %), ethyleneglycol dimethacrylate (0.28 wt. %), and diethyleneglycol dimethacrylate (0.33 wt. %).

In some preferred embodiments a nonionic monomer having a homopolymer Tg of greater than 50° C., such as methyl methacrylate or styrene or other styrenic monomers or a soft hydrophilic monomer having a homopolymer Tg less than 30° C. and water solubility of 2% or greater at 25° C. such as ethyl acrylate, methyl acrylate, vinyl acetate is added to the second or subsequent stage polymer(s). As used herein, soft hydrophilic monomers have a homopolymer Tg less than about 30° C. and water solubility of 2% or greater at 25° C. Ethyl acrylate, methyl acrylate, and vinyl acetate are examples of soft hydrophilic monomers.

Additionally, the polymer may contain additional plasticizers, tackifiers, crosslinkers, multi-valent metal ion salts, defoamers, thickeners, rheology modifiers, pigments, and wetting agents.

Specific tackifiers of the present invention include high softening point tackifiers. Typically they are present in ranges from upper limits of 50 and 25 wt. % to lower limits of 0.5 to 1 wt. % based on total weight of polymer. All ranges are inclusive and combinable. As used herein, high softening point tackifiers is defined as tackifiers having a softening point of 100° C. or greater. Typically these compounds are added as an aqueous dispersion.

After the additional ethylenically unsaturated monomer is added to the first stage polymer, sufficient time is allowed to permit the additional monomer to swell the latex particles. The additional monomer which is used may be selected to include only those monomers which have low water solubility. By low water-solubility is meant a solubility in water at ambient temperature of less than about 2 g/100 g of water (2 wt. %). Preferably, the additional monomer is allowed to swell the first stage polymer until the monomer swollen first stage polymer has been swollen essentially to equilibrium with the additional alpha, beta-ethylenically unsaturated monomer. The aqueous dispersion may be agitated during the swelling process.

After the first stage polymer has been swollen essentially to equilibrium, the additional monomer is polymerized within the monomer swollen initial latex polymer. This second or subsequent stage polymerization may be initiated by conventional free radical generating initiator systems. Preferably the initiation occurs by way of redox initiation.

For example, emulsion polymerization process may be a thermal or redox type; that is, free radicals may be generated solely by the thermal dissociation of an initiator species or a redox system may be used. A polymerization initiator of the free radical type, such as ammonium or potassium persulfate, may be used alone or as the oxidizing component of a redox system, which also includes a reducing component such as potassium metabisulfite, sodium thiosulfate, or sodium formaldehyde sulfoxylate. The reducing component is frequently referred to as an accelerator. The initiator and accelerator, commonly referred to as catalyst, catalyst system, or redox system, may be used in proportion from about 0.01% or less to 3% each, based on the weight of monomers to be polymerized. Examples of redox catalyst systems include t-butyl hydroperoxide/sodium formaldehyde sulfoxylate/Fe(II) and ammonium persulfate/sodium bisulfite/sodium hydrosulfite/Fe(II). Other suitable initiators include azo compounds. The polymerization temperature may be from 10° C. to 90° C., or more, and may be optimized for the catalyst system employed, as is conventional. Emulsion polymerization may be seeded or unseeded.

The two-stage or multi-stage latex polymer emulsion PSAs described above may be applied to polymer foam substrates or plasticized polyvinyl chloride substrates to form the composites of the present invention. Methods to prepare these composites are commonly known to those of ordinary skill in the art.

Suitable polymer foam substrates for forming composites of the present invention comprise foams formed from polyvinyl chloride (PVC), polyvinyl acetates, polypropylenes, polyurethanes, polystyrene, acrylate copolymers, and homo- and co-polymers of ethylene, especially low and very low density polyethylenes (LDPE, LLDPE, VLDPE), ethylene vinyl acetate copolymers, and mixtures thereof. Foams formed from other polymers may also be used to form the composites of the present invention.

Foam materials can be employed in crosslinked or uncrosslinked form. Foam densities may be from 20, 25 to 150, 250, 400 kg/m$^3$. All density ranges are inclusive and combinable. The foam can have a closed-cell, open-cell or mixed-cell structure. It is possible to use foams with or without a skin, and of integral or non-integral structure. In accordance with the invention, it is likewise possible to employ laminates of two or more foam materials. The foams may be rigid, semi-rigid or flexible.

The thickness of the foam materials employed is not limiting. In some embodiments, the polymer foam may have a thickness in the range between 175 μm, 250 μm, 350 μm and 3 mm, 5 mm, 10 mm. In some embodiments, the thickness may be in the range from 0.25 mm to 50, 100 mm. All thickness ranges are inclusive and combinable.

In one embodiment of the invention, the polymer foams are formulated with stearates or other low molecular weight extrusion lubricants. These additives can be useful in foams which will be formed by an extrusion process, but may be detrimental to the performance of PSAs of the prior art used in such composites.

In one embodiment of the invention, the polymer foam substrate may comprise a polymer and a plasticizer. Particular useful polymer foam substrates for use in the composites of the present invention are formed from PVC and plasticizer.

In one embodiment of the invention, the polymer substrate can be a dense, plasticized PVC film. For those embodiments wherein the substrate comprises plasticized PVC, the plasticizer may be polymeric or monomeric.

Suitable monomeric plasticizers for use in the composites of the present invention include phthalates, adipates, trimellitates, sebacates, benzoates, epoxidized vegetable oils, sulfonamides, organophosphates and glycols/polyethers. Non-limiting examples of the foregoing classes of monomeric plasticizers include the following: phthalates: bis(2-ethylhexyl) phthalate (DEHP); diisononyl phthalate (DINP); bis (n-butyl)phthalate (DnBP, DBP); butyl benzyl phthalate (BBzP); diisodecyl phthalate (DIDP); di-n-octyl phthalate (DOP or DnOP); diisooctyl phthalate (DIOP); diethyl phthalate (DEP); diisobutyl phthalate (DIBP); di-n-hexyl phthalate; adipates: bis(2-ethylhexyl)adipate (DOA); dimethyl adipate (DMAD); monomethyl adipate (MMAD); dioctyl adipate (DOA); trimellitates: trimethyl trimellitate (TMTM); tri-(2-ethylhexyl) trimellitate (TEHTM-MG); tri-(n-octyl,n-decyl) trimellitate (ATM); tri-(heptyl,nonyl) trimellitate (LTM); n-octyl trimellitate (OTM); maleates: dibutyl maleate (DBM); diisobutyl maleate (DIBM); sebacates: dibutyl sebacate (DBS); sulfonamides: n-ethyl toluene sulfonamide (o/p ETSA), ortho and para isomers; N-(2-hydroxypropyl) benzene sulfonamide (HP BSA); N-(n-butyl) benzene sulfonamide (BBSA-NBBS); organophosphates: tricresyl phosphate (TCP); tributyl phosphate (TBP); and glycols/polyethers: triethylene glycol dihexanoate (3G6, 3GH); tetraethylene glycol diheptanoate (4G7). Plasticizers with better biodegradability and less biochemical effects may also be used, including without limitation, acetylated monoglycerides, citrates and nitrates; such as alkyl citrates, triethyl citrate (TEC), acetyl triethyl citrate (ATEC), tributyl citrate (TBC), acetyl tributyl citrate (ATBC), trioctyl citrate (TOC), acetyl trioctyl citrate (ATOC), trihexyl citrate (THC), acetyl trihexyl citrate (ATHC), butyryl trihexyl citrate (BTHC, trihexyl o-butyryl citrate), and trimethyl citrate (TMC).

Suitable polymeric plasticizers for use in the composites of the present invention include polyesters, nitrile rubbers and ketone ethylene ester polymers.

The beneficial aging properties of composites of the present invention, and the latex polymer emulsion used therein, are particularly evident when the plasticized PVC substrate comprises monomeric plasticizer.

The amount of plasticizer present in the PVC varies depending on the desired properties for the PVC substrate and the applications in which it will be used, as is known to those with ordinary skill in the art. In typical applications, the amount of plasticizer can comprise from 0 to 86 wt. % plasticizer based on the total weight of the PVC formulation used in the composite article of the present invention. The latex polymer emulsion used in the composites are most beneficial when used in conjunction with flexible PVC substrates, typically comprising from 30 to 50 wt. % plasticizer based on the total weight of the PVC formulation.

The PVC substrate may further comprise heat and ultraviolet light (UV) stabilizers, color pigments, lubricants, biocides, antioxidants, and fillers.

EXAMPLES

Comparative Example 1

Step 1—Polymerization of First Polymer

A monomer emulsion containing the following materials is prepared:

| | |
|---|---|
| DI Water | 623.6 g |
| butyl acrylate | 1768.9 g |

-continued

| | |
|---|---|
| methacrylic acid | 36.1 g |
| Triton ™ X-405 surfactant (70%) | 25.8 g |
| sodium dodecylbenzene sulfonate (23%) | 7.85 g |

Into a 5 liter, four-neck, round-bottomed flask equipped with a stirrer, thermometer, and reflux condenser was charged 841.5 g of deionized (DI) water which is heated to 83°-85° C. in a nitrogen atmosphere. A catalyst co-feed solution of 1.97 g sodium persulfate/$H_2O$ in 139.9 g DI water is prepared.

At 83°-86° C. the following materials are charged to the kettle:

| | |
|---|---|
| $Na_2CO_3/H_2O$ | 1.23 g/12.3 g |
| $Na_2S_2O_8/H_2O$ | 5.9 g/24.6 g |
| 100 nm polymer seed emulsion (45%) | 103.5 g |
| Rinse water for seed emulsion | 20.5 g |

Immediately after these charges, the monomer emulsion and the cofeed catalyst solution are fed at a rate calculated to give a 180 minute feed. A temperature of 80°-82° C. is maintained by cooling as required.

Near the end of the monomer emulsion and catalyst solution feeds the following solutions are prepared:

| | Neutralizer 4.1 g Aq. $NH_3$/12.3 g $H_2O$ | |
|---|---|---|
| Chaser A | $FeSO_4$ (0.15% Soln.) | 5.47 g |
| Chaser B | t-Butyl hydroperoxide (70%) | 0.41 g |
| | DI $H_2O$ | 12.3 g |
| Chaser C | sodium sulfoxylate formaldehyde | 0.41 g |
| | DI $H_2$° | 24.6 g |

When the monomer emulsion and the catalyst solution feeds are complete, the temperature is held at 80°-82° C. for 10 minutes before the neutralizer is added. The reaction is then cooled to 60° C. where chasers A, B, and C are added. The reaction product is held for 15 minutes at temperature, cooled to room temperature and filtered through a 100 mesh (0.149 mm sieve opening) screen Example 1

Step 1—Polymerization of First Polymer

A monomer emulsion containing the following materials is prepared:

| | |
|---|---|
| DI Water | 623.6 g |
| butyl acrylate | 1768.9 g |
| methacrylic acid | 36.1 g |
| Triton ™ X-405 surfactant (70%) | 25.8 g |
| sodium dodecylbenzene sulfonate (23%) | 7.85 g |

Into a 5 liter, four-neck, round-bottomed flask equipped with a stirrer, thermometer, and reflux condenser is charged 841.5 g of deionized (DI) water which is heated to 83°-85° C. in a nitrogen atmosphere. A catalyst co-feed solution of 1.97 g sodium persulfate/$H_2O$ in 139.9 g DI water is prepared.

At 83°-86° C. the following materials are charged to the kettle:

| | |
|---|---|
| $Na_2CO_3/H_2O$ | 1.23 g/12.3 g |
| $Na_2S_2O_8/H_2O$ | 5.9 g/24.6 g |
| 100 nm polymer seed emulsion (45%) | 103.5 g |
| Rinse water for seed emulsion | 20.5 g |

Immediately after these charges, the monomer emulsion and the cofeed catalyst solution are fed at a rate calculated to give a 180 minute feed. A temperature of 80°-82° C. is maintained by cooling as required.

Near the end of the monomer emulsion and catalyst solution feeds the following solutions are prepared:

| | Neutralizer 4.1 g Aq. $NH_3$/12.3 g $H_2O$ | |
|---|---|---|
| Chaser A | $FeSO_4$ (0.15% Soln.) | 5.47 g |
| Chaser B | t-Butyl hydroperoxide (70%) | 0.41 g |
| | DI $H_2O$ | 12.3 g |
| Chaser C | sodium sulfoxylate formaldehyde | 0.41 g |
| | DI $H_2$° | 24.6 g |

When the monomer emulsion and the catalyst solution feeds are complete, the temperature is held at 80°-82° C. for 10 minutes before the neutralizer is added. The reaction is then cooled to 60° C. where chasers A, B, and C are added. The reaction is held for 15 minutes at temperature, cooled to room temperature with stirring and allowed to sit overnight.

Step 2—Addition and Polymerization of Additional Monomers

The reaction is warmed to 25° C. under nitrogen with stirring. 95 g 1,3-butylene glycol dimethacrylate is added over 5 minutes and stirred for 30 minutes under nitrogen. 1.33 g 70% aqueous t-butyl hydroperoxide in 17.4 grams DI water is added to the reactor followed immediately by 152 g of a 3% vanadyl sulfate solution. An exotherm is observed and the reaction is held for 60 minutes with stirring.

The reaction product is cooled and filtered through a 100 mesh (0.149 mm sieve opening) screen.

Comparative Example 2

Comparative Example 2 is prepared according to the procedure of Comparative Example 1 with the exceptions that 451.25 g of butyl acrylate is replaced with 451.25 g of ethyl acrylate.

Example 2

Example 2 is prepared according to the procedure of Example 1 with the exception that 451.25 g of butyl acrylate is replaced with 451.25 g of ethyl acrylate.

Comparative Example 3

Comparative Example 3 is prepared according to the procedure of Comparative Example 1 with the exceptions that 216.6 g of butyl acrylate is replaced with 216.6 g of ethyl acrylate.

Example 3

Example 3 is prepared according to the procedure of Example 1 with the exception that 216.6 g of butyl acrylate is replaced with 216.6 g of ethyl acrylate.

Comparative Example 4

Comparative Example 4 is prepared according to the procedure of Comparative Example 1 with the exceptions that 722 g of butyl acrylate is replaced with 722 g of ethyl acrylate.

Example 4

Example 4 is prepared according to the procedure of Example 1 with the exception that 722 g of butyl acrylate is replaced with 722 g of ethyl acrylate.

Tackified Examples

Emulsion polymers are combined with Aqueous Dispersion Tackifier A (ADT-A) and Aqueous Dispersion Tackifier B (ADT-B) according to Table 1. ADT-A has a softening Point of 100° C. and ADT-B has a softening Point of 125° C.

TABLE 1

| | | |
|---|---|---|
| Comparative Example 1A | 100 g Comparative Example 1 | 25 g ADT-A |
| Comparative Example 1B | 100 g Comparative Example 1 | 10 g ADT-B |
| Example 1A | 100 g Example 1 | 25 g ADT-A |
| Example 1B | 100 g Example 1 | 10 g ADT-B |
| Comparative Example 2A | 100 g Comparative Example 2 | 25 g ADT-A |
| Comparative Example 2B | 100 g Comparative Example 2 | 10 g ADT-B |
| Example 2A | 100 g Example 2 | 25 g ADT-A |
| Example 2B | 100 g Example 2 | 10 g ADT-B |
| Comparative Example 3A | 100 g Comparative Example 3 | 25 g ADT-A |
| Comparative Example 3B | 100 g Comparative Example 3 | 10 g ADT-B |
| Example 3A | 100 g Example 3 | 25 g ADT-A |
| Example 3B | 100 g Example 3 | 10 g ADT-B |
| Comparative Example 4A | 100 g Comparative Example 4 | 25 g ADT-A |
| Comparative Example 4B | 100 g Comparative Example 4 | 10 g ADT-B |
| Example 4A | 100 g Example 4 | 25 g ADT-A |
| Example 4B | 100 g Example 4 | 10 g ADT-B |

Forming Composite Article Comprising PVC Foam

Each of the tackified and untackified emulsions are coated onto 1 cm thick flexible, plasticized PVC foam using a #72 Meyer Rod. The coated foam is allowed to dry at ambient temperature for 20 minutes, then at 70° C. for 3 minutes, then at 100° C. for 3 minutes. The dried composite article is conditioned overnight at 23° C. and 50% relative humidity.

Testing the Ageing Characteristics of the Composite Article

For each of the foam composites four test panels are made by applying the coated side of a 2.54 cm wide by 30.5 cm long strip of the composite article to a stainless steel panel and a 5 kg roller is passed over it 4 times. Two of the panels are aged in a 70° C. oven for 7 days then allowed to equilibrate overnight at 23° C. and 50% relative humidity. Two control panels are stored at 23° C. and 50% relative humidity during this time. The foam composites are then peeled from the steel panels at a rate of 30.5 cm/minute and at an angle of 180° from the face of the panel in a peel force tester. The peel force and failure mode are recorded. Failure modes can be: Adhesive—the adhesive layer peels away from the steel panel; Cohesive—the adhesive leaves residue on both the foam and steel panel; Adhesive Failure from Backing (AFB)—the adhesive remains on the steel panel; Partial Foam Tear—the foam tears leaving some foam on the panel; or Total Foam Tear—the foam tears leaving a layer of foam over the entire adhered surface. Higher Peel forces are desirable. Most desirable is Partial Foam Tear or Total Foam Tear.

All Examples perform better than their Comparative Example counterparts, demonstrating either higher peel forces or more desirable failure modes.

We claim:

1. A composite article comprising a polymer foam and a pressure sensitive adhesive film formed from a latex polymer emulsion, wherein the latex polymer emulsion is prepared by a process comprising:
   (a) preparing by emulsion polymerization a first stage polymer of at least one ethylenically unsaturated monomer, wherein said first stage polymer has a Tg of less than −20° C.;
   (b) dispersing in the first stage polymer, additional ethylenically unsaturated monomer comprising at least one monomer having at least two sites of alpha, beta-ethylenic unsaturation, whereby the additional monomer swells the first stage polymer, and
   (c) polymerizing the additional monomer within the monomer-swollen first stage polymer.

2. The composite article of claim 1 wherein the foam comprises polyvinyl chloride resin and at least one plasticizer.

3. The composite article of claim 2 wherein the foam comprises at least one monomeric plasticizer.

4. The composite article of claim 1 wherein the latex polymer emulsion further comprises tackifier.

5. The composite article of claim 1, wherein the first stage polymer comprises:
   i) at least 40% of a monomer having a homopolymer Tg of less than 40° C.; and
   ii) 10 to 50% of a soft hydrophilic, nonionic monomer having a homopolymer Tg of less than 30° C.

6. A composite article comprising polyvinyl chloride substrate comprising at least one plasticizer, and a pressure sensitive adhesive film formed from a latex polymer emulsion, wherein the latex polymer emulsion is prepared by a process comprising:
   (a) preparing by emulsion polymerization a first stage polymer of at least one ethylenically unsaturated monomer, wherein said first stage polymer has a Tg of less than −20° C.;
   (b) dispersing in the first stage polymer, additional ethylenically unsaturated monomer comprising at least one monomer having at least two sites of alpha, beta-ethylenic unsaturation, whereby the additional monomer swells the first stage polymer, and
   (c) polymerizing the additional monomer within the monomer-swollen first stage polymer.

7. The composite article of claim 6 wherein the substrate comprises at least one monomeric plasticizer.

8. The composite article of claim 6 wherein the latex polymer emulsion further comprises tackifier.

9. The composite article of claim 6, wherein the first stage polymer comprises:
   i) at least 40% of a monomer having a homopolymer Tg of less than 40° C.; and
   ii) 10 to 50% of a soft hydrophilic, nonionic monomer having a homopolymer Tg of less than 30° C.

10. A composite article comprising (i) a polymer foam comprising polyvinyl chloride resin and at least one plasticizer and (ii) a pressure sensitive adhesive film formed from a latex polymer emulsion, wherein the latex polymer emulsion is prepared by a process comprising:
 (a) preparing by emulsion polymerization a first stage polymer of at least one ethylenically unsaturated monomer, wherein said first stage polymer has a Tg of less than −20° C.;
 (b) dispersing in the first stage polymer, additional ethylenically unsaturated monomer comprising at least one monomer having at least two sites of alpha, beta-ethylenic unsaturation, whereby the additional monomer swells the first stage polymer, and
 (c) polymerizing the additional monomer within the monomer-swollen first stage polymer.

\* \* \* \* \*

UNITED STATES PATENT AND TRADEMARK OFFICE
CERTIFICATE OF CORRECTION

PATENT NO. : 7,723,396 B2
APPLICATION NO. : 12/006841
DATED : May 25, 2010
INVENTOR(S) : Ralph Craig Even, Robert Victor Slone and Sekhar Sundaram It is certified that error appears in the above-identified patent and that said Letters Patent is hereby corrected as shown below:

Claim 5, Column 14, line 39 "less than 40°C;" should read -- less than -40°C; --

Claim 9, Column 14, line 65 "less than 40°C;" should read -- less than -40°C; --

Signed and Sealed this

Twelfth Day of October, 2010

David J. Kappos
*Director of the United States Patent and Trademark Office*